United States Patent [19]

Bonke et al.

[11] Patent Number: 5,023,831
[45] Date of Patent: Jun. 11, 1991

[54] INTELLIGENT DISK DRIVE HAVING CONFIGURABLE CONTROLLER SUBSYSTEM PROVIDING DRIVE-STATUS INFORMATION VIA HOST-COMPUTER EXPANSION BUS

[75] Inventors: Carl Bonke, Rancho Santa Margarita; Han Jen, Diamond Bar, both of Calif.

[73] Assignee: Western Digital Corporation, Irvine, Calif.

[21] Appl. No.: 511,957

[22] Filed: Apr. 17, 1990

Related U.S. Application Data

[63] Continuation of Ser. No. 220,536, Jul. 18, 1988, abandoned.

[51] Int. Cl.[5] ............................................. G06F 13/12
[52] U.S. Cl. ................................ 364/900; 364/926.9; 364/940.71; 364/942.4; 364/952.1
[58] Field of Search ... 364/200 MS File, 900 MS File

[56] References Cited

U.S. PATENT DOCUMENTS

| | | | |
|---|---|---|---|
| 4,153,933 | 5/1979 | Blume, Jr. et al. | 364/200 |
| 4,360,870 | 11/1982 | McVey | 364/200 |
| 4,380,052 | 4/1983 | Shima | 364/900 |
| 4,491,914 | 1/1985 | Sujaku | 364/200 |
| 4,773,005 | 9/1988 | Sullivan | 364/200 |

FOREIGN PATENT DOCUMENTS 2110847 6/1983 United Kingdom.

Primary Examiner—Thomas C. Lee
Attorney, Agent, or Firm—Christie, Parker & Hale

[57] ABSTRACT

The invention provides a method and circuit for control of intelligent or integrated disk drives whereby a single computer address port may be used for control of two intelligent disk drives. The circuit requires only a single jumper connection for definition of the drive address. Tristate drivers on all output circuits from the disk drive controller to the host computer are disabled when the drive is not selected.

10 Claims, 2 Drawing Sheets

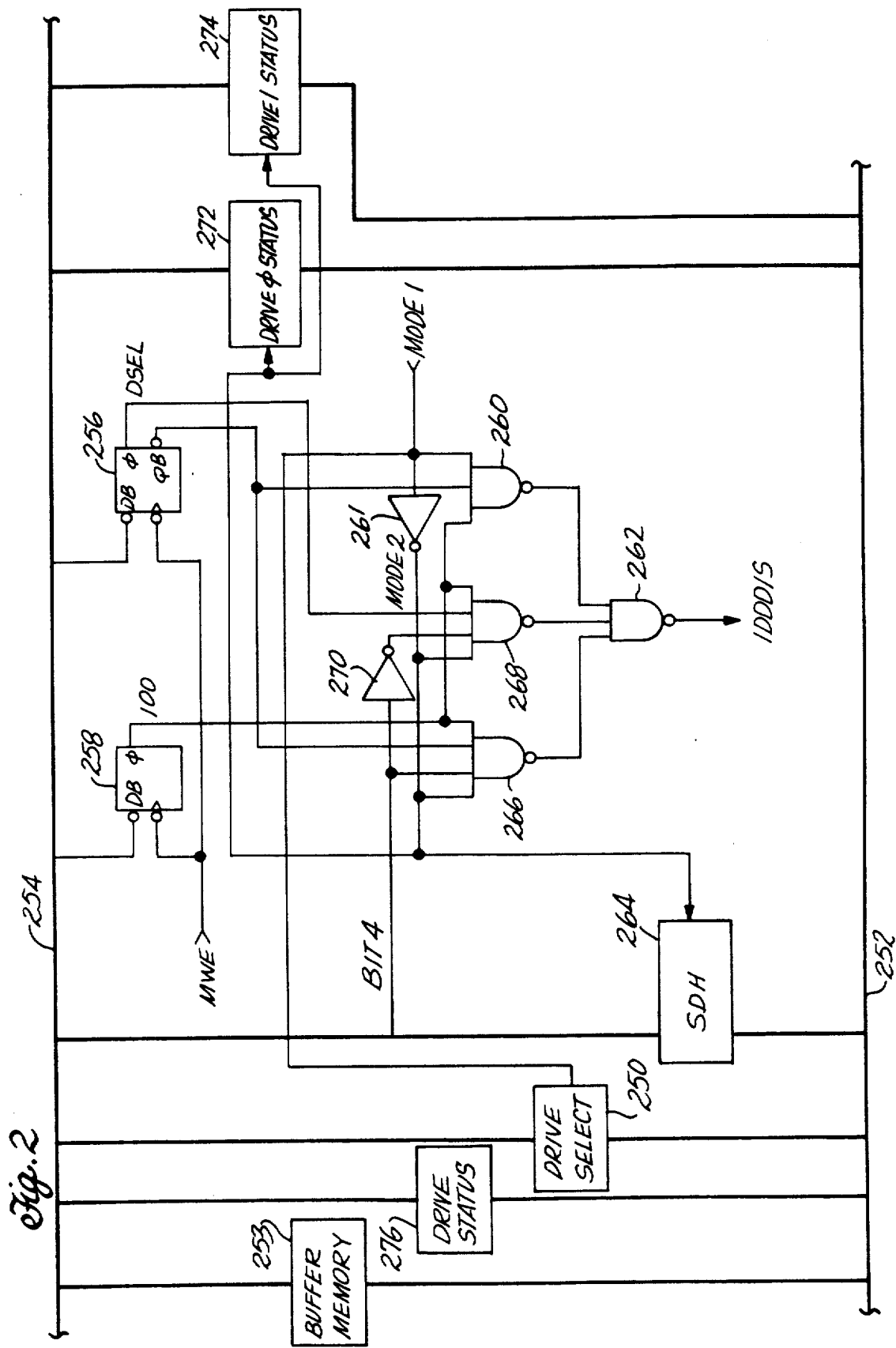

INTELLIGENT DISK DRIVE HAVING CONFIGURABLE CONTROLLER SUBSYSTEM PROVIDING DRIVE-STATUS INFORMATION VIA HOST-COMPUTER EXPANSION BUS

CROSS-REFERENCE TO RELATED APPLICATIONS

This is a continuation of application Ser. No. 07/220,536, filed 7-18-89, now abandoned.

This invention relates generally to the communications and control of disk drives by a host computer. More particularly, the invention provides a method and circuit for control of intelligent or integrated disk drives whereby a single computer address may be used for control of two intelligent disk drives.

BACKGROUND OF THE INVENTION

Microcomputers normally provide a single expansion slot or other connection point for external disk drives. Controller cards designed for attachment to the interface had previously provided control capability for two "dumb" disk drives. The host computer accesses either of the drives through the controller by the use of a common address selecting the controller and a disk drive selection bit provided to a command register within the controller. The controller provides the status of both disk drives to the computer and interprets computer selection commands to activate one or the other drive as the selected drive.

More recently, intelligent or integrated disk drives have become available. The intelligent disk drive incorporates the controller within the disk drive unit, requiring only an address and data cable hook-up to the host microcomputer. In this configuration, however, one intelligent disk drive consumes the single expander port or connection point with the address and host data cables. Techniques have been developed for driving two intelligent disk drives from a common cable set; however, external jumper connections for designation of single or multiple disk operation, master or slave designation, and drive number designation have been required.

Operation of the intelligent disk drive, therefore, required selection of its configuration and installation of the appropriate jumper connections. As an example, if a disk drive were to be the master drive, or drive 0, in a two-drive hook-up, the jumper designating master drive would be installed. The jumper designating no second drive would not be installed, and the third jumper indicating a second drive present would be installed. Conversely, on the second drive, the first two jumpers would not be installed, and the third jumper designating a slave drive present would be installed. It should be noted that the master drive would not function properly if the slave drive were not present. For a master drive operating singly, the first and second jumpers would be installed, while the third jumper would not. The prior art technique described, therefore, required three jumpers uniquely installed for any configuration operation, singly or multiply. The present invention eliminates the requirements for multiple jumpers. A single jumper designating device address is sufficient.

SUMMARY OF THE INVENTION

The present invention provides a disk drive controlled by an internal microprocessor interface wherein the microprocessor has one firmware bit programmable to designate intelligent drive operation. A single external jumper connection is provided for connection to a pull-up resister. Connection of the jumper designates a disk drive controller as drive 1. Absence of the jumper designates a disk drive controller as drive 0. A sensing means interconnects the jumper connection with the microprocessor for sensing of the jumper connection. A disabling circuit under the control of the microprocessor is connected to the tristate drivers on all outputs from the disk drive controller unit to the host computer. Commands issued by the host computer are read by the disk drive controller. The microprocessor in the controller compares the drive selected by the computer with the drive number of the controller selected by connection of the jumper. The comparison result is provided to the disable circuit whereby a comparison "not true" will disable the tristate write drivers. A compare "true" will enable the tristate write drivers, allowing transfer of command acknowledgement signals and data by the intelligent disk drive to the host computer.

BRIEF DESCRIPTION OF THE DRAWINGS

FIG. 2 provides a schematic logic diagram of the tristate driver disable circuit.

DETAILED DESCRIPTION OF THE INVENTION

Figure 1:
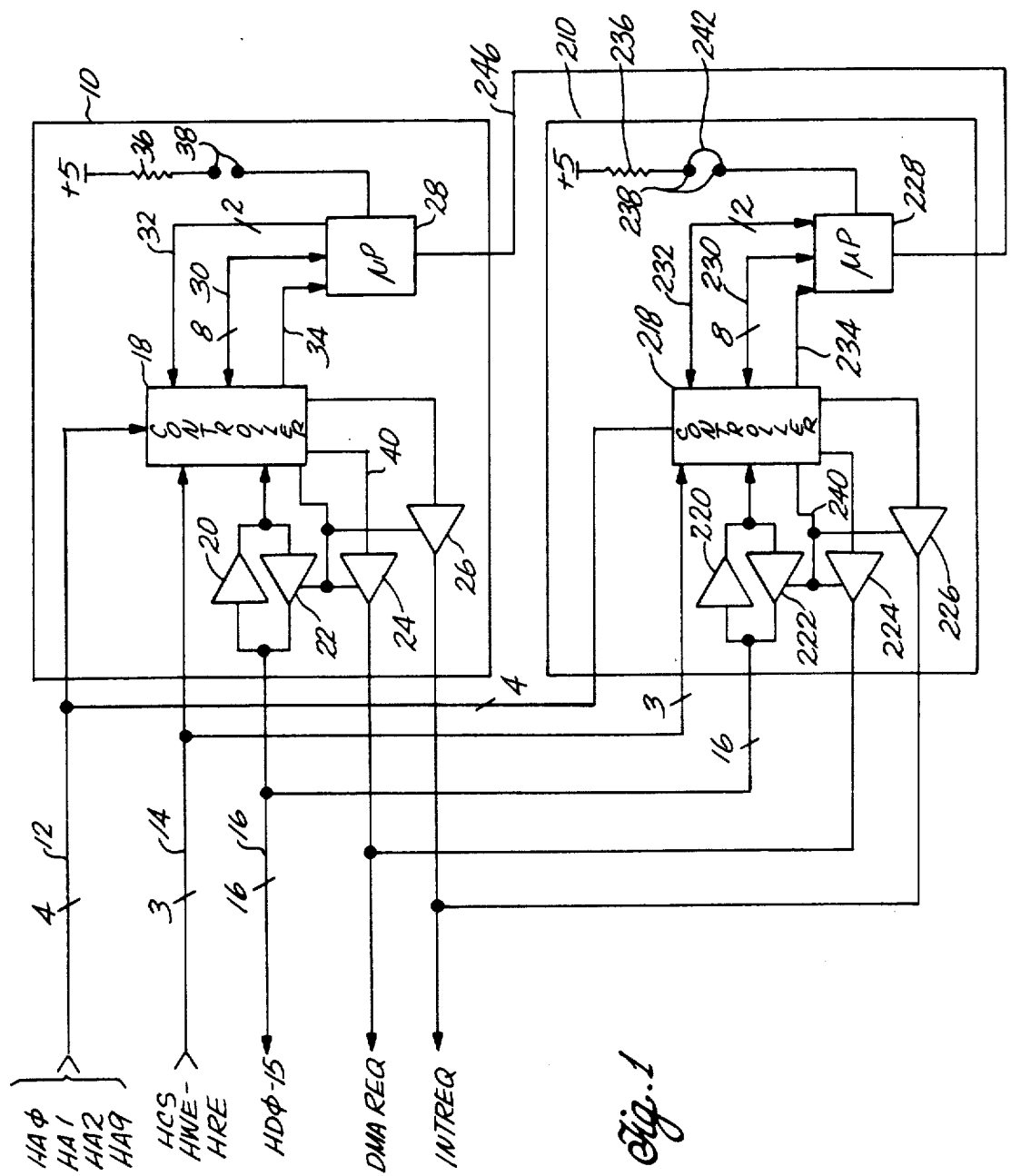
FIG. 1 provides a schematic diagram for two intelligent-drive disk controllers, employing the invention attached in parallel to a host computer interface.

Referring to FIG. 1, a first disk drive controller 10 is connected to the host computer interface through a first address bus 12, a second address bus 14, and a bidirectional data bus 16. The peripheral controller 18 receives the host register address signals HA0, HA1, HA2 and HA9 for selection of data registers internal to the peripheral controller. The host chip select signal HCS- the host write enable signal HWE-, and the host read enable HRE- are received by the peripheral controller on address bus 14. Tristate read drivers 20 and tristate write drivers 22 connect the host data bus 16 to the peripheral controller. The peripheral controller provides direct memory access request signals, DMAREQ, to the host computer through tristate write driver 24. Similarly, the peripheral controller provides interrupt request signals, INTREQ, to the host computer through tristate write driver 26.

A microprocessor 28 communicates with the peripheral controller through an address data bus 30. A microprocessor write enable signal MWE is provided to the peripheral controller on line 32, and the peripheral controller provides a microprocessor interrupt MINT signal to the microprocessor on line 34. A pull-up resister 36 is provided for connection through jumper points 38 to the microprocessor. The peripheral controller provides a disable signal for write drivers 22, 24, and 26 on line 40. Assertion of the disable signal by the peripheral controller precludes data transfer from the peripheral controller to the host data bus and precludes transmission of DMAREQ and INTREQ to the host computer.

A second intelligent disk drive controller 210 is connected to the host computer in parallel with the first intelligent disk drive controller. The second disk drive controller is identical in configuration to the first disk drive controller. Components of the second disk drive controller include the peripheral controller 218, host data bus read drivers 220, and host data bus light write drivers 222, direct memory access request write driver 224, interrupt request write driver 226, microprocessor 228, address data bus 230, microprocessor write enable signal line 232, microprocessor interrupt signal line 234, pull-up resister 236, jumper connection points 238, and write driver disable signal line 240. The second intelligent disk drive controller has a jumper 242 connecting the jumper connect points 238.

A drive interconnection line 246 connects the first and second intelligent drives. This line is commonly called "slave present", and is a standard connection in multiple disk drive interface cables. Interconnect line 246 is sensed by the microprocessor 28 of the first drive and the microprocessor 228 of the second drive. Firmware in the second drive microprocessor decodes the presence of jumper 242 in the second drive designating the second drive as drive 1. The second microprocessor 228 will output a "slave present" signal on the interconnect line 246, which is, in turn, read by microprocessor 28 in the first intelligent disk drive.

Operation of the second intelligent disk drive controller is identical to that described for the first intelligent disk drive controller. However, host computer commands addressed to the disk drives which result in a drive selected compare "false" in intelligent disk drive controller 0 will result in a disk drive selected compare "true" in intelligent disk drive number 1, due to the installation of the jumper 242.

INTREQ or DMAREQ signals acknowledging the host command will be transmitted to the host computer from the peripheral controller of only the selected drive. The drive not selected -will have the Write drivers disabled. Consequently, while both drives receive and interpret the commands from the host computer, only one drive will respond.

The details of the disable circuit for the write drivers is shown in FIG. 2. The configuration shown in FIG. 2 is a preferred embodiment providing for support of multiple types of host computers. For a first computer type (computers equivalent to the IBM-XT), commands to the intelligent disk drive controller will include accessing of a drive select register 250 through the first host address bus 12 and second host address bus 14 of FIG. 1. Data is written to the drive select register from the internal host data bus 252. The internal host data bus is the continuation of the host data bus 16 of FIG. 1.

The peripheral controller will issue an interrupt signal MINT to the microprocessor when the host computer writes to the drive select register. Data is written to the microprocessor by the host as a command block. The command block transferred through the buffer memory 253 is read by the microprocessor on the microprocessor data bus 254. The data bit of the command block representing the drive number is compared by the microprocessor with the intelligent disk drive controller drive number determined by the presence of the jumper connection. Sensing of the jumper connection may be accomplished by a direct connection of the jumper connection point to an input of the microprocessor or through a multiplexed bus architecture for configuration sensing as described in copending Patent Application for a Multiplexed Bus Architecture for Configuration Sensing by Jen and Goldstone, U.S. application Ser. No. 07/220,533, filed 7/18/88, now U.S. Pat. No. 4,866,309, and having a common assignee with the present application, the disclosure of which is herein incorporated by reference.

The microprocessor will write a disk selection bit to a first flip/flop 256 from the microprocessor address data bus by assertion of the microprocessor write enable signal MWE. A mode signal MODE1 designating the host computer type is also provided by the microprocessor.

Additionally, a second control bit is provided by the microprocessor designating the configuration of the peripheral controller as an intelligent disk drive unit. This bit is written to a second flip/flop 258 from the microprocessor address data bus simultaneously with writing of the disk select bit to the first flip/flop upon assertion of MWE. The drive select bit provided by the microprocessor to the first flip/flop for the first computer type will be a "1" for drive selected or a "0" for drive not selected. A "0" for drive not selected will result in a high signal from the inverting output of the first flip/flop. The presence of the intelligent disk drive bit as a "1" in the second flip/flop and the MODE1 signal high for designation of the first computer type will, therefore, result in a "true" condition on NAND gate 260. This will, in turn, result in a false condition of NAND gate 262 producing a high intelligent disk drive disable signal, IDDDIS, to be transmitted to the write drivers, placing them in a tristate condition.

A drive selected signal from the host computer resulting in a drive select bit "1" in flip/flop 256 will result in a low signal from the inverting output of the flip/flop, thereby creating a false condition in NAND gate 260, and forcing the output of NAND gate 262 low, thereby enabling the tristate drivers for normal communication between the intelligent disk drive controller and the host computer.

If the second host computer type (computers equivalent to the IBM-AT) is interfaced to the intelligent disk drive controller, the host computer will access a plurality of registers, including a select disk and head or SDH register 264. The peripheral controller will interrupt the microprocessor by assertion of the MINT signal as discussed previously. The microprocessor will assess the host computer command and provide on the microprocessor address data bus a "1" in the disk select bit if the jumper is installed, and a "0" if the jumper is not installed. The IDD bit and the disk select bit will be written to flip/flops 256 and 258 as previously described.

The SDH register bit designating the selected drive, bit 4, will then be compared with the drive select bit present in flip/flop 256 through NAND gates 266 and 268. The second host computer type is interfaced; therefore, the MODE1 signal will be low, resulting in a high signal through inverter 261. NAND gate 266 receives SDH bit 4 and the inverted output from flip/flop 256 while NAND gate 268 receives the normal output of flip/flop 256 and an inversion of the SDH bit 4 through inverter 270. Based on this configuration, a "11" comparison or a "00" comparison of the two bits will result in a "false" indication from both NAND gates 266 and 268. The consequent high signals from NAND gates 266 and 268 will render NAND gate 262 "true", resulting in a low IDDDIS signal, thereby allowing the write drivers to remain enabled. A "10" or "01" comparison of the two bits will result in a "true" indication from the NAND gates 266 and 268. The consequent low outputs from the NAND gates 266 and 268 will result in a "false" condition on NAND gate 262, providing a high IDDDIS signal, thereby disabling the write drivers.

A third computer communication type (computers equivalent to the IBM-PS2) is supported similarly to the second mode with alterations of the registers for drive select bit. Those skilled in the art will recognize that multiple registers may be used for interfacing multiple computer types and multiplexers provided to select appropriate bits from the registers for drive selection. Such an interface method is described in the patent application to Carl Bonke et al. for a Data Recording System Buffer Management and Multiple Host Interface Control U.S. patent application Ser. No. 07/220,531, filed 7/18/88, and having a common assignee with the present application, the disclosure of which is incorporated herein by reference.

The embodiment of the invention shown in FIG. 2 further includes a drive 0 status register 272 and a drive 1 status register 274, which are enabled when the invention is interfaced to the second computer type. The drive 0 status register is enabled to provide status to the host computer from the intelligent disk drive when drive 0 is addressed and no jumper is installed, thereby designating the drive as drive 0. The drive 1 status register provides status to the host computer when the drive 1 is selected, and the jumper is installed designating the intelligent disk drive controller as drive 1.

The embodiment shown in FIG. 2 provides for operation of the disk drive controller when interfaced to the second computer type, regardless of the presence of one or the other intelligent disk drive units. If the second drive (drive 1) is not present, the first intelligent drive will continue to be operable without modification. The interconnect line 246, previously described, will no longer be connected to the second drive. The microprocessor of the first intelligent drive, sensing a slave not present, will not provide a "1" in the IDD bit for the second flip/flop 258 of FIG. 2. The IDDDIS signal will, therefore, not be asserted. The drive 0 status for the first intelligent disk drive will be provided to the computer upon request through the drive 0 status register 272. If the host computer attempts to access the second intelligent disk drive, or drive 1, the first intelligent disk drive will provide a "drive not ready" condition in the drive 1 status register 274.

Similarly, the second intelligent disk drive, if present without the first intelligent disk drive, may provide similar capability, giving a drive 0 "not ready" signal in response to attempted access of the first disk drive by the host computer while providing a "normal" status for the second disk drive on the drive 1 status register.

Similar operation may be achieved for the first host computer type through control of the drive status register 276 by the microprocessor. Attempted access by the host computer of the missing disk drive will result in a "drive busy" status, while attempted access of the host computer of the disk drive which is present will result in a "normal" drive status provided to the drive status register.

The invention as shown in the embodiment will be operable, regardless of the presence of a second drive, without reconfiguring the jumper. This provides a distinct advantage over the prior art where absence of the second disk drive in either the master or slave condition designated by the three jumpers, as previously described, requires alteration of the jumper connections to provide proper operation.

Having now described the invention in detail in accordance with the requirements of the Patent statutes, those skilled in this art will have no difficulty in making changes and modifications in the individual circuit elements, or their relative connections, in order to meet specific requirements or conditions. Such changes and modifications may be made without departing from the scope and spirit of the invention as set forth in the following claims.

What is claimed is:

1. A controller subsystem for incorporation with a disk drive in an intelligent disk drive unit that connects to a host computer via a host computer expansion bus to which a second intelligent disk drive unit may optionally be connected, the expansion bus including address and data lines, and an interconnect line, the host computer applying a common address to the address lines in the course of each of a plurality of sequences in which the host computer sends drive-selection information to identify a single disk drive, the controller subsystem comprising:

a microprocessor;
peripheral-controller means including register means for storing drive-status information to be sent to the host computer;
bus means connecting the microprocessor to the peripheral controller means, the microprocessor providing binary-valued operation control signals to the peripheral controller means via the bus means;
controllable bus-driver circuit means for selectively sending the stored status information from the register means to the host computer via the expansion bus;
the peripheral controller means further including latching means for latching the binary-valued operation-control signals, and gating means responsive to the latched operation-control signals for controlling the controllable bus-driver circuit means;
means connected to the interconnect line for carrying a first configuration-defining signal to the microprocessor;
configurable means for providing a second configuration-defining signal to the microprocessor to designate a selected disk-drive identification number for the disk drive that is incorporated with the controller subsystem in the intelligent disk drive unit;
the microprocessor causing a first operation-control signal to have a first value only upon receipt of the first configuration-defining signal, and causing a second operation-control signal to have a value depending upon the second configuration-defining signal;
the gating means being responsive to the first operation-control signal having a second value for selectively disabling the controllable bus-driver circuit means depending on the value of the second operation-control signal, and being responsive to the first operation-control signal having the first value for enabling the controllable bus-driver circuit means to provide said drive-status information irrespective of the value of the second operation-control signal.

2. A controller subsystem in accord with claim 1, wherein the controllable bus-driver circuit means comprises tri-state write-driver circuit means connected to the expansion bus.

3. A controller subsystem in accord with claim 1, wherein the register means includes a first register for storing drive-status information concerning a first disk drive, and a second register for storing drive-status information concerning a second disk drive.

4. A controller subsystem in accord with claim 3, wherein the register means includes a third register for storing drive-status information, and wherein the microprocessor provides to the gating means a binary-valued mode signal having a first value to identify a first type of host computer that receives said drive-status information from the third register, and having a second value to identify a second type of host computer that receives said drive-status information from one of the first or second registers.

5. A controller subsystem in accord with claim 1, wherein the latching means comprises a first flip-flop and a second flip-flop, wherein the microprocessor provides to the grating means a binary-valued mode signal having a first value for a first mode for interfacing to a first type of host computer that identifies a single drive in a select-drive sent via the expansion bus, and having a second value for a second mode for interfacing to a second type of host computer that identifies a single drive in a select-head-and-disk signal sent via the expansion bus, wherein the microprocessor provides to the first flip-flop the first operation-control signal that, int he first mode, has a binary value that depends upon the select-drive signal, and, in the second mode, has a value that is independent of the select-drive signal, and wherein the gating means includes means responsive to the mode signal and the select-head-and-drive signal for selectively disabling the controllable bus-driver circuit means.

6. A controller subsystem in accord with claim 5, wherein the configurable means includes circuit means that produce a predetermined signal upon insertion of a jumper.

7. A peripheral controller for a controller subsystem for a disk drive in an intelligent disk drive unit that connects to a host computer via a host computer expansion bus to which a second intelligent disk drive unit may optionally be connected, the host computer applying a common address to the expansion bus in the course of each of a plurality of sequences in which the host computer sends drive-selection information to identify the single disk drive, the peripheral controller comprising:

first interface means for communication of signals via a first bus;
second interface means for communication of signals via the expansion bus;
a first flip-flop for latching a first binary-valued operation-control signal received via the first bus, and a second flip-flop for latching a second binary-valued operation-control signal received via the first bus;
information-storing register means including means for storing drive-status information to be sent to the host computer in the course of every sequence in which the drive-selection information the host computer sends identifies a first predetermined drive, and including means for storing predetermined information to be selectively sent to the host computer in the course selected sequences in which the drive-selection information the host computer sends identifies a second predetermined drive;
tri-state write-driver circuit means connected to the expansion bus, and having a control input for receiving a driver-control signal having an enable value for causing the tri-state write-driver circuit means to send said drive-status information from the register means to the host computer via the expansion bus, and having a disable value for preventing such sending of said drive-status information;
gating means responsive to the first and second latched operation-control signals for producing the driver-control signal, the gating means being responsive to the first operation-control signal having a first value for enabling the tri-state write-driver circuit means to send either said drive-status information or a predetermined information depending upon the value of the second operation-control signal, and being responsive to the first operation-control signal having a second value for selectively enabling or disabling the tri-state write-driver circuit means to send said drive-status information depending upon the value of the second operation-control signal.

8. A peripheral controller in accord with claim 7, wherein the register means includes a first register for storing drive-status information concerning a first disk drive, and a second register for storing drive-status information concerning a second disk drive.

9. A controller subsystem in accord with claim 8, wherein the register means includes a third register for storing drive-status information, and wherein the gating means is controllable by a binary-valued mode signal having a first value to identify a first type of host computer that receives said drive-status information from the third register, and having a second value to identify a second type of host computer that receives said drive-status information from one of the first or second registers.

10. A multiple disk drive computer system comprising:

a host computer having an expansion bus for sending and receiving signals including signals defining command sequences and signals defining status information, the expansion bus including a plurality of lines for carrying addresses and data, and an interconnect line;
a first intelligent disk drive unit connected to the host computer by the expansion bus, the first unit having therein a first disk drive and a first controller subsystem, the first unit including configurable means defining a first drive identifier, the first controller subsystem including first comparison means for producing a first comparison signal having a first drive-selected value if, in the course of a command sequence in which the host computer sends a predetermined common address followed by a drive-selection signal, the first drive identifier and the drive-selection signal have matching values, the first controller subsystem including means enabled by the first comparison signal having the first drive-selected value for sending drive-status information to the host computer;
a second intelligent disk drive connected to the expansion bus, the second unit having therein a second disk drive and a second controller subsystem, the second unit including configurable means defining a second drive identifier; the second controller subsystem including second comparison means for producing a second comparison signal having a second drive-selected value if, in the course of a command sequence in which the host computer sends the predetermined common address followed by a drive-selection signal, the second drive identifier and the drive-selection signal have matching values, the second controller subsystem including means enabled by the second comparison signal having the second drive-selected value for sending drive-status information to the host computer;

each of the first and second units having means for communicating presence-indicating signals via the interconnect line such that, if one of the units is removed from the system, the other unit will not receive such a presence-indicating signal;

the first unit having means, operative if the presence-indicating signal is not received from the second unit, for sending predetermined information to the host computer via the expansion bus in response to a command sequence in which the value of the drive-selection signal has the second drive-selected value; and the second unit having means, operative if the presence-indicating signal is not received from the first unit, for sending predetermined information to the host computer via the expansion bus in response to a command sequence in which the value of the drive-selection signal has the first drive-selected value.

* * * * *

UNITED STATES PATENT AND TRADEMARK OFFICE
CERTIFICATE OF CORRECTION

PATENT NO. : 5,023,831

DATED : June 11, 1991

INVENTOR(S) : Carl Bonke; Han Jen

It is certified that error appears in the above-identified patent and that said Letters Patent is hereby corrected as shown below:

In the Specification:

Column 1, line 10, change "7-18-89" to -- 7-18-88 --.

Column 2, line 3, change "resister" to -- resistor --.

Column 3, line 1, after "bus" delete "light".
Column 3, line 2, change "drivers 222" to -- driver 222 --.
Column 3, line 6, change "resister" to -- resistor --.
Column 3, line 33, change "Write" to -- write --.
Column 3, lines 62,63, change "copending Patent Application" to -- co-pending patent application --.

Column 4, line 41, change "assess" to -- access --.

Column 5, line 67, change "Patent" to -- patent --.

UNITED STATES PATENT AND TRADEMARK OFFICE
CERTIFICATE OF CORRECTION

PATENT NO. : 5,023,831

DATED : June 11, 1991

INVENTOR(S) : Carl Bonke; Han Jen

It is certified that error appears in the above-identified patent and that said Letters Patent is hereby corrected as shown below:

In the claims

Column 7, line 14, change "grating" to -- gating --.
Column 7, line 17, after "select-drive" insert
    -- signal --.
Column 7, lines 22,23, change "int he" to -- in the --.

Signed and Sealed this

Sixth Day of April, 1993

Attest:

STEPHEN G. KUNIN

Attesting Officer

Acting Commissioner of Patents and Trademarks